United States Patent [19]

Guttman et al.

[11] 4,293,417
[45] Oct. 6, 1981

[54] FILTER PRESS

[75] Inventors: Murray M. Guttman, Sandy, Utah; William L. Fismer, Verona, N.J.

[73] Assignee: Envirotech Corporation, Menlo Park, Calif.

[21] Appl. No.: 143,991

[22] Filed: Apr. 28, 1980

Related U.S. Application Data

[63] Continuation of Ser. No. 35,651, May 3, 1979, abandoned.

[51] Int. Cl.³ .............................................. B01D 25/12
[52] U.S. Cl. .................................................. 210/230
[58] Field of Search ................ 210/224, 225, 230, 231

[56] References Cited

U.S. PATENT DOCUMENTS

| | | | |
|---|---|---|---|
| 3,562,155 | 2/1971 | Rademacher et al. | 210/224 |
| 3,623,424 | 11/1971 | Busse et al. | 210/224 |
| 3,780,747 | 12/1973 | Stadie et al. | 210/225 |
| 3,826,374 | 7/1974 | Busse et al. | 20/225 |
| 4,083,298 | 4/1978 | Schotten | 210/224 |
| 4,159,249 | 6/1979 | Schotten | 210/230 |
| 4,172,793 | 10/1979 | Oelbermann | 210/230 |
| 4,196,084 | 4/1980 | Schotten | 210/224 |
| 4,222,873 | 9/1980 | Parsons | 210/224 |

*Primary Examiner*—Theodore A. Granger
*Attorney, Agent, or Firm*—Robert E. Krebs; T. J. McNaughton

[57] ABSTRACT

An improved filter press for separating solids from liquid is provided. The press includes a plurality of filter plates which are suspended from overhead I-beams such that the plates may be removed either from the top of the press or from the sides of the press as desired. The filter plates are suspended from the I-beams by rollers which alternate in position for adjacent filter plates between engagement with the outside flanges and engagement with the inside flanges of the beams and, thus, allow larger rollers to be utilized. The filter press includes a press head for moving the individual filter plates into abutting relationship which is pivotally suspended from the I-beams such that the press head can assume the alignment of the filter plates when the press is closed. The press further includes a pair of vertically-arranged, independently-operable hydraulic closing rams for applying different closing pressures at the top and bottom of the filter plates to compensate for variations in plate stacking.

6 Claims, 5 Drawing Figures

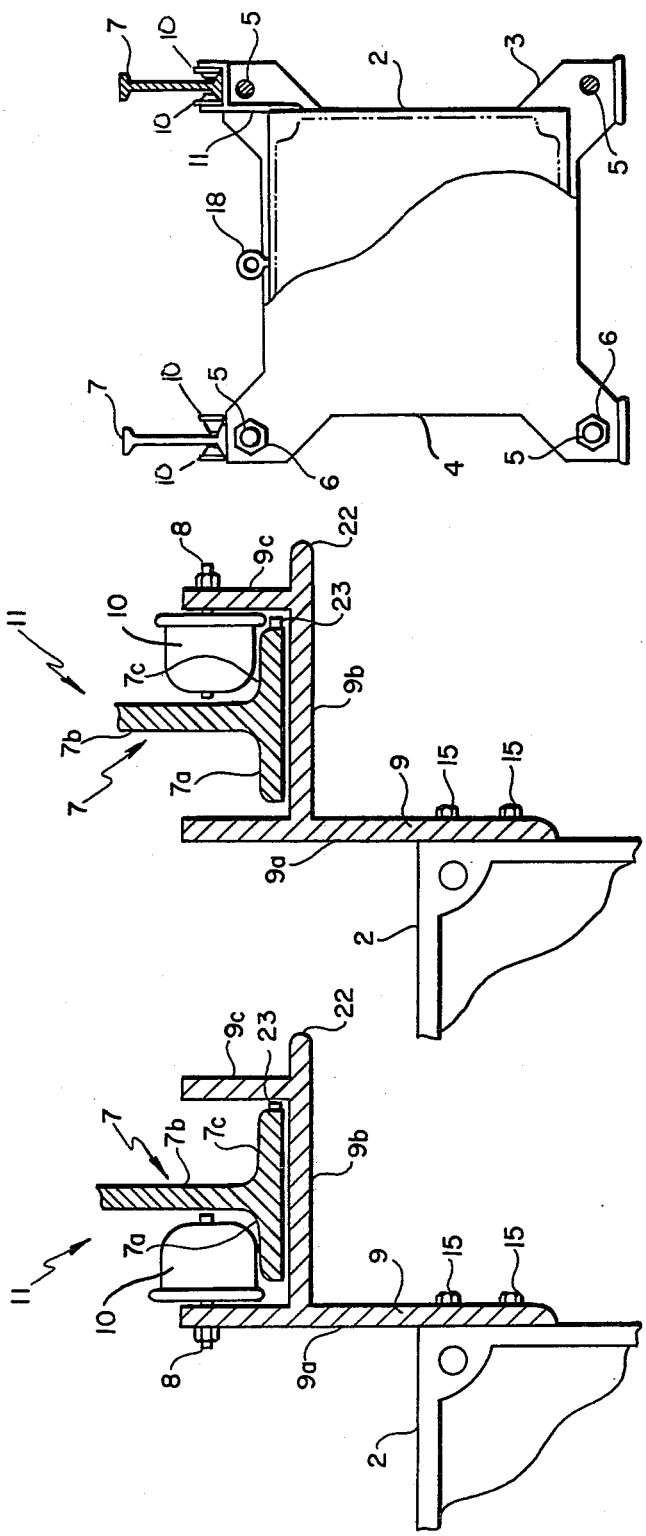

FILTER PRESS

This is a continuation of application Ser. No. 035,651, filed May 3, 1979, now abandoned.

BACKGROUND OF THE INVENTION

1. Field of the Invention

This invention relates to filter presses for separating solids from liquid and, more particularly, to an improved filter press wherein the filter plates of the press are suspended from overhead support beams.

2. State of the Art

Filter presses are well known for separating solids from liquid slurries and the like. Conventional filter presses generally include a series of parallel, vertically disposed filter plates supported on a frame. The filter plates are covered on both sides with a filtration medium which permits liquid to flow therethrough but prevents the flow of solids contained in the liquid. Each of the filter plates is formed to have a peripheral rim which extends completely about the perimeter of the plate and an inner recessed drainage face on both sides of the plate. Thus, when adjacent plates are brought together in abutting relationship, the rims of adjacent plates engage to form a liquid-tight seal while the recessed inner faces form feed chambers between adjacent plates.

For filtration, the individual filter plates of the press are brought together in abutting, sealing relationship by a closing device, typically a hydraulic ram. The liquid slurry or the like from which solids are to be removed is then fed under pressure into the chambers between adjacent plates. The pressure of the feed slurry forces the liquid to flow from the feed chambers through the filtration medium to be discharged from the press. The solids in the slurry are left behind in the chambers between the plates. Filtration proceeds until the chambers are filled with filter cake or until a predetermined terminal pressure is reached. The filtration cycle is then complete; the feed to the press is stopped, the filter plates are moved apart and the filter cake is removed from the press.

Primary considerations in the design of filter presses are ease of operation, ease of maintenance and the amount of time that elapses between the end of one and the beginning of the next filtration cycle. These factors are influenced to a great extent by the manner in which the filter plates are supported on the frame of the filter press and on the means utilized to move the individual filter plates into abutting relationship.

In one well-known type of filter press, the filter plates are supported, either slideably or by means of rollers, on two horizontal siderails which extend along the vertical sides of the filter plates between two end support members. In this type of press, the filter plates can be removed only from the top of the press.

In another type of filter press, the filter plates are suspended, either slideably or by means of rollers, from one or more horizontal beams located directly above the filter plates and extending between two end support members. In this type of press, the plates can be removed only from the sides of the press.

OBJECTS AND ADVANTAGES OF THE INVENTION

An object and advantage of the present invention is an improved filter press wherein the filter plates may be removed either from the top of the press or from the sides of the press as desired.

A further object and advantage of the present invention is an improved filter press wherein less-complicated, less-expensive filter plate support rollers are utilized.

A still further object and advantage of the present invention is an improved filter press wherein variations in filter plate stacking are eliminated to insure a liquid-tight seal between adjacent plates.

An understanding of the present invention will be gained by reference to the following description and to the appended drawings which are offered for illustration only and not in limitation of the invention, the scope of which is defined by the appended claims and equivalents to the structure, materials and acts recited therein.

BRIEF DESCRIPTION OF THE DRAWINGS

FIG. 3 is a detail view of a typical plate hanger assembly 11 having roller 10 located on section 9a of bracket 9 and positioned on the inside flange 7a of beam 7;

FIG. 4 is a detail view of a typical plate hanger assembly 11 having roller 10 located on section 9c of bracket 9 and positioned on the outside flange 7c of beam 7; and FIG. 5 is a partially cut-away end view of the filter press of FIG. 1 showing the location of filter plates 2 on the press in relation to support beams 7 and tie rods 5.

DESCRIPTION OF THE PREFERRED EMBODIMENT

Figure 1:
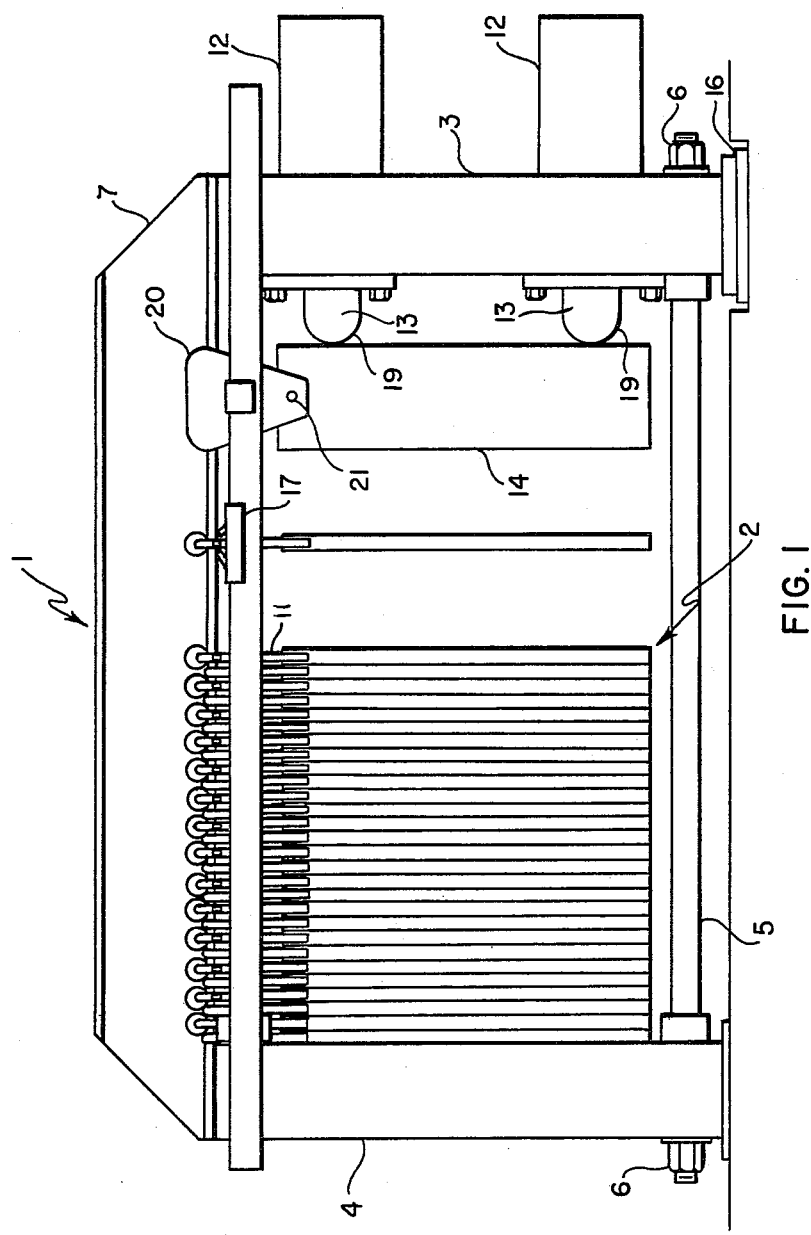
FIG. 1 is a side elevational view of a filter press according to the present invention.

The filter press shown in FIG. 1 is mounted on a foundation and generally includes a frame 1 which supports a plurality of moveably-suspended, vertically-disposed filter plates 2. The frame 1 includes stationary opposite end stands 3 and 4 which are supported in a generally vertical position by horizontal, parallel tie rods 5. The tie rods 5 are threaded at their ends, extend through the width of the end stands 3 and 4 and are held in place by nuts 6. The end stand 3 is slidably mounted on a slide surface 16 located in the press foundation to reduce stresses to the foundation due to press elongation.

According to one aspect of the present invention, two closing devices 12, preferably hydraulic rams, are mounted in vertical alignment on end stand 3 and extend therethrough. Each closing device 12 includes an extensible rod 13 having a rounded preferably hemispherical end 19 which is pivotally attached to a press head 14.

Press head 14 is movably suspended from frame 1 by a pair of trolleys 20 which are attached to opposite sides of the press head 14 and mounted for horizontal movement on frame 1. Press head 14 is pivotally attached to the trolleys 20 at pivot connections 21. Closing devices 12 are independently operable to move press head 14 horizontally and, thus, to move the filter plates 2 into abutting relationship.

Figure 2:
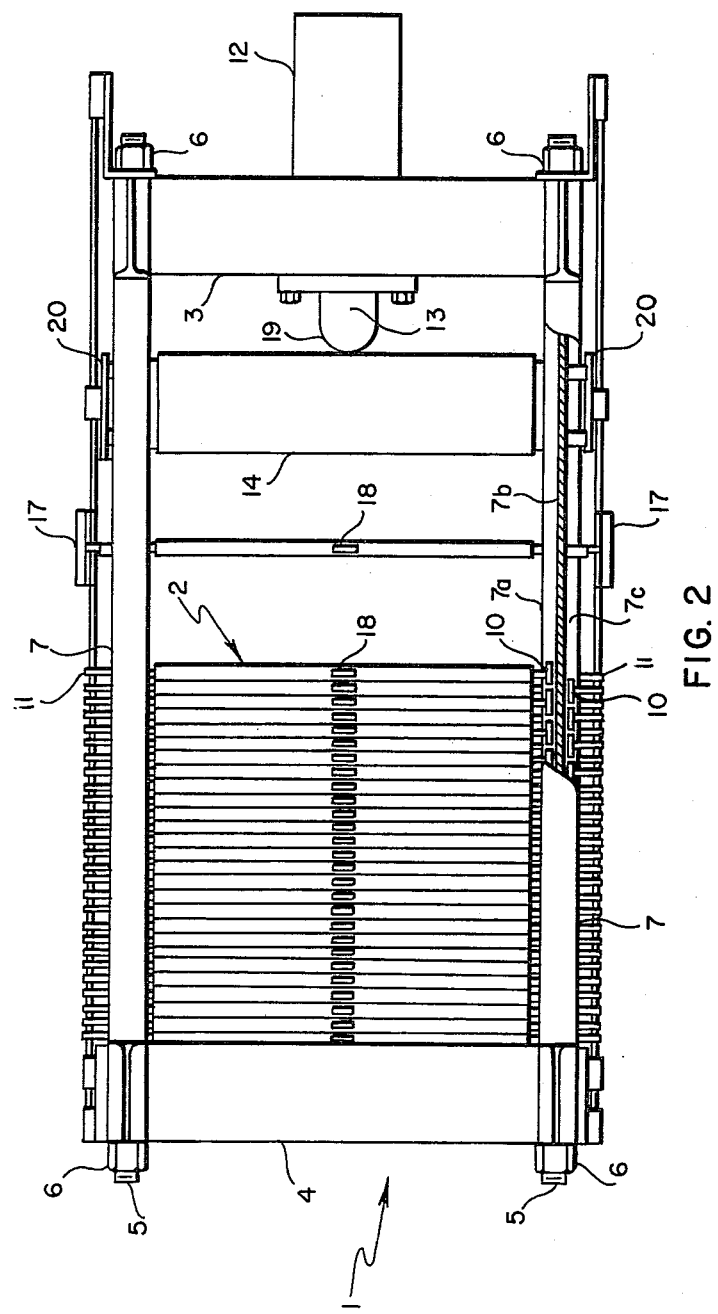
FIG. 2 is a partially cut-away plan view of the filter press of FIG. 1 showing the alternating location of rollers 10 on the lower flanges 7a and 7c of beams 7.

Referring to FIG. 2, frame 1 includes two horizontal, parallel support beams 7 fixedly mounted at opposite sides of the top of end stands 3 and 4 to extend therebetween. In the illustrated embodiment, the support beams 7 are conventional I-beams having a lower inside flange 7a and a lower outside flange 7c located on opposite sides of a web 7b. The horizontal distance between the support beams 7 is greater than the horizontal dimension of the filter plate 2 so that the filter plates 2 may be removed from the top of the filter press by passing the plates between the support beams 7.

A pair of filter plate shifting mechanisms 17 are mounted on opposite sides of the filter press frame 1, preferably on support beams 7. The shifting mechanisms 17 are adapted to be moved lengthwise of the filter press by chains or other suitable means. The shifting mechanisms 17 are provided with pawls which can be selectively erected to engage handles or other extensions on the filter plates to enable the filter plates to be moved horizontally in one direction or the other for opening or closing the filter press. Furher details of the preferred shifting mechanism may be ascertained by reference to U.S. Pat. No. 3,306,455.

Filter plates 2 are movably suspended from the support beams 7 by a pair of plate hanger assemblies 11 which are attached to opposite sides of the filter plates 2. As shown in FIGS. 3 and 4, in the preferred embodiment, each plate hanger assembly 11 includes a bracket generally designated 9 and a roller 10 rotatably attached to the bracket 9 by axle 8. Bracket 9 includes a generally vertical section 9a the width of which is equal to or less than the width of filter plate 2. Bracket 9 is attached to filter plate 2 by any suitable means, such as by bolts 15, such that the vertical section 9a extends above the top of the filter plate 2. Extending from the vertical section of the bracket away from filter plate 2 is a horizontal arm 9b. Extending upwardly from the horizontal section 9b is a second vertical section 9c. In the illustrated embodiment, the horizontal distance between vertical section 9a and vertical section 9c is slightly greater than the width of support member 7 and the vertical sections 9a and 9c extend the same distance above the horizontal section 9b of bracket 9.

As illustrated in FIGS. 3 and 4, the roller 10 may be attached to the bracket 9 either by mounting roller 10 on vertical section 9a or by mounting roller 10 on vertical section 9c. In the filter plate hanger assemblies 11 of a particular filter plate 2, the rollers 10 are mounted on the same vertical section of bracket 9. That is, in the filter plate hanger assembly of the filter plate 2 shown in FIG. 3, roller 10 is mounted on vertical section 9a of bracket 9; an identical hanger assembly 11, with roller 10 mounted on vertical section 9a, is attached to the opposite side of the illustrated filter plate 2.

According to another aspect of the present invention, in the hanger assemblies of adjacent filter plates 2, rollers 10 are alternately mounted on vertical sections 9a and 9c. That is, as described above, the filter plate 2 of FIG. 3 has rollers 10 mounted on the vertical section 9a. In the hanger assemblies 11 of the filter plates 2 located adjacent the filter plate 2 shown in FIG. 3, the rollers 10 are mounted on the vertical section 9c of bracket 9 as illustrated in FIG. 4.

Each hanger assembly 11 also includes a "handle" or other extension 22 for engagement with the pawls of shifting mechanisms 17 as described hereinabove.

It can now be understood that the individual filter plates 2 are suspended from support beams 7 by positioning the rollers 10 of a particular plate on the lower flanges of the beams 7 to ride thereon. As shown in FIG. 2, for those filter plates having hanger assemblies 11 with rollers 10 attached to section 9a of bracket 9, the rollers 10 are positioned on the inside flanges 7a of the support beams 7; for those filter plates having hanger assemblies with rollers attached to sections 9c of bracket 9, the rollers 10 are positioned on the outside flanges 7c of beams 7.

A spacer or wear strip 23 is attached to the end of the outer flange 7c of the support beams 7 to promote smooth, uniform horizontal movement of the hanger assemblies 11 and, thus, of filter plates 2 along support beams 7.

In the illustrated embodiment, press head 14 is suspended from support beams 7 by positioning trolleys 20 on the flanges of the support beams.

Referring now to FIG. 5, it can be seen that tie rods 5 extend between the corresponding corners of the end stands 3 and 4. The vertical distance between the tie rods 5 is greater than the vertical dimension of the filter plates 2 so that filter plates 2 may be removed from the sides of the filter press by passing the plates 2 between the pair of tie rods 5 located on either side of the frame 1. The horizontal distance between the tie rods 5 is greater than the horizontal dimension of the filter plates 2 so that the filter plates 2 may be removed from the top of the press by passing the plates between the pair of tie rods 5 located at the top of the frame 1. A lifting eye 18 is attached to the top of each of the filter plates 2 so that the plates may be easily removed from the top of the press by a conventional lifting device, such as an overhead crane. Such a crane can be mounted for horizontal movement on the overhead support beams 7. In addition, support beams 7 can serve as the support structure for a traveling overhead washer system for washing filter cloths when the filter press is open.

Thus, it can be understood that the aforedescribed filter press provides several advantages over prior devices. A major advantage of the instant filter press is that it allows the filter plates thereof to be removed either from the top of the press or from the sides of the press as desired. This advantageous feature is accomplished by providing a filter press frame inclusive of horizontal filter plate support beams mounted above the filter plates and spaced apart horizontally a distance greater than the horizontal dimension of plates.

Another advantage of the instant filter press is that the filter plates are suspended from the support beams by rotatable rollers which alternate for adjacent filter plates between engagement with the outside flange and engagement with the inside flange of the horizontal support beams. By this alternating roller arrangement, larger, less-complicated and, thus, less-expensive rollers may be utilized because the diameter of the rollers can exceed the width of the filter plates and can, in fact, be up to twice the width of the filter plates.

Another advantage of the instant filter press is that the filter plates are moved into abutting relationship by two vertically-arranged, independently-operable closing devices having hemispherical ends. Thus, because of the independent operation of the closing devices, a different closing pressure and speed may be applied at the bottom than is applied at the top of the filter plate stack. By this arrangement, adjustments can be made in moving the filter plates into abutting relationship to compensate for variations in plate stacking. The hemispherical ends of the closing devices allow the press head to pivot to assume the alignment of the filter plate stack. Thus, a liquid-tight seal between the plates is insured. Also, since the closing devices of the instant filter press push rather than pull the filter plates into abutting relationship, the full piston side of the closing devices receives the closing oil pressure and, hence, the closing devices may be operated at much lower pressures than closing devices which pull the plates together. This results in a safer work environment.

A still further advantage provided by the instant filter press is that the filter plate shifting mechanisms are located above the filter plates. This arrangement prevents exposure of the shifting mechanisms to fouling by filter cake during cake discharge. Also, the location of shifting mechanisms on opposite sides of the filter plates prevents the plates from "rocking" during horizontal movement and, thus, reduces wear on both the plates and the filter medium.

The operation of the above-described filter press may now be understood. At the beginning of a filtration cycle, the closing devices 12 are activated and the rod 13 of each closing device 12 is extended to move press head 14 horizontally toward end stand 4. As press head 14 moves toward end stand 4, it pushes the filter plates 2 of the press into abutting relationship to form a liquid-tight seal therebetween.

The sealing engagement of the filter plates during the closing procedure may be hampered by solids which have accumulated between the filter plates and particularly at the bottom rim of the plates. Such solids accumulation can result from incomplete discharge of filter cake from the chambers between adjacent plates. Because the vertically-arranged closing devices of the present invention are independently operable and, thus, can apply a greater pressure at either the top or the bottom of the filter plates 2 to compensate for these accumulations and because the press head 14 may pivot to assume the alignment of the filter plate stack, a liquid-tight seal between the plates is insured.

When the filter plates 2 are closed in sealing engagement, liquid slurry is fed to the press and filtered by pumping it through the plates of the press. After a certain amount of slurry has been filtered, cakes of filtered solids build up in the chambers between the plates and reach such a thickness that it becomes necessary to separate the plates to remove the cakes. At that time, the flow of slurry to the press is stopped. The closing devices 12 are then activated so that the rods 13 are retracted and press head 14 is moved away from the filter plates 2 toward end stand 3. The individual filter plates 2 are then separated from one another by shifting mechanisms 17 in the manner described above and set forth in detail in U.S. Pat. No. 3,306,455. As the individual filter plates 2 are separated, the filter cake which has built up therebetween drops from the press.

Before the beginning of the next filtration cycle, it may be necessary, for one reason or another, to remove the filter plates 2 from the press. According to the present invention, and as described hereinabove, the filter plates may be removed either from the top of the press or from either side of the press as desired.

We claim:

1. An improved filter press for removing solids from liquid comprising:
   a. a plurality of vertically-disposed filter plates;
   b. a frame inclusive of a pair of horizontal filter plate support beams, said beams having an inside flange and an outside flange; and
   c. a pair of filter plate hanger assemblies attached to each of said filter plates, each of said hanger assemblies inclusive of a bracket and a roller rotatably attached to said bracket, said rollers positioned on said support beams to ride thereon such that said filter plates are moveably suspended from said beams, said rollers for adjacent filter plates alternating in transverse position on said beams between engagement with said outside flanges of said beams and engagement with said inside flanges of said beams such that the diameter of said rollers can be greater than the thickness of one of said filter plates.

2. A filter press according to claim 1 further including filter plate closing means mounted on said frame for moving said filter plates into abutting relationship by exerting pressure thereon, said closing means operative to exert a different pressure at the top of said filter plates than at the bottom of said filter plates.

3. The filter press of claim 2 wherein said filter plate closing means comprises two vertically-arranged, independently-operable hydraulic rams.

4. A filter press according to claim 3 further including a press head moveably suspended from said frame between one of said end stands and said plurality of filter plates, said press head pivotally suspended from said frame such that said press head can assume the alignment of said plurality of filter plates when said plates are in abutting relationship.

5. The filter press of claim 4 wherein said hydraulic rams include extension rods having hemispherical ends pivotally attached to said press head such that said rams can move said filter plates into abutting alignment as said press head assumes the alignment of said abutting filter plates.

6. The improved filter apparatus of claim 1 wherein said frame includes a pair of opposite end stands at the end of the support beams, the support beams being mounted on the end stands to extend therebetween with the horizontal distance between the beams being sufficiently greater than the width of the filter plates in a direction transverse to their direction of travel to allow the filter plates to be removed from the top of the frame by passing the plates between the beams, means mounted to each filter plate at a location between the support beams for engagement with a plate removal device for elevating each plate, and said hanger assemblies being removably attached to the filter plates.

* * * * *